UNITED STATES PATENT OFFICE 2,476,986

ACID HALIDES OF 5-ACYLOXYPYRAZOLES

Elmore Louis Martin, Wilmington, Del., assignor to E. I. du Pont de Nemours & Company, Wilmington, Del., a corporation of Delaware No Drawing. Application March 27, 1946, Serial No. 657,629

11 Claims. (Cl. 260—310)

This invention relates to new heterocyclic nitrogen compounds and, more particularly, to 5-acyloxypyrazole derivatives and to their preparation.

An object of this invention is to provide a new class of heterocyclic nitrogen compounds. A more specific object is to provide such compounds which are useful as dye intermediates. A further object is to provide a new class of 5-acyloxypyrazoles which contain an acid halide group in the 1- and/or 3-positions and are useful as color formers or as intermediates in the preparation of high molecular weight color formers. Still other objects will be apparent from the following description.

The novel compounds of this invention are 5-acyloxypyrazoles which contain an acid halide group in at least one of the positions 1- and 3- of the pyrazole ring, the acyl and acid halide groups of which contain a radical taken from the group consisting of carbonyl (>C=O) and sulfonyl (>SO$_2$) radicals. These compounds can advantageously be prepared by reacting a 5-pyrazolone containing, in at least one of the 1- and 3-positions a carboxylic or sulfonic acid group with an acylating agent and converting any acid group of the resulting acyloxypyrazole to an acid halide group.

An important class of compounds of the invention is acid halides which may be represented by the general formula:

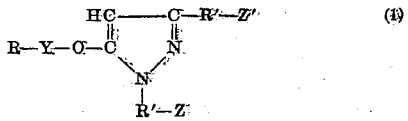

wherein Y is a member taken from the group consisting of carbonyl and sulfonyl radicals, RY is any acyl radical free from acid halide-reactive groups, e. g., reactive methylene, hydroxyl, amino, thiol, etc. groups, R' is a divalent organic radical linked by "hydrocarbon carbon" atoms to Z and Z'; Z and Z' are members taken from the group consisting of hydrogen, carbonyl halide (—COX), and sulfonyl halide (—SO$_2$X) radicals where X is a halogen, e. g., chlorine and bromine, at least one of Z or Z' being an acid halide radical. By "hydrocarbon carbon" atoms is meant carbon atoms which have only hydrogen or a hydrocarbon radical attached thereto.

R' in the above formula is preferably a divalent aliphatic or aromatic hydrocarbon nucleus or a heterocyclic nucleus but may consist of two of such nuclei joined by a bivalent bridging radical, e. g., —O—, —S—, —SO$_2$NH—, —CO—, —SO$_2$—, —CONH—. The hydrocarbon nuclei may contain various substituents which are common in color formers and do not enter into dye coupling reactions, e. g., alkoxy, chlorine, bromine, nitro, acylamido, alkyl, e. g., methyl, ethyl, aryl, e. g., phenyl and naphthyl, etc.

The preferred compounds have the general formula:

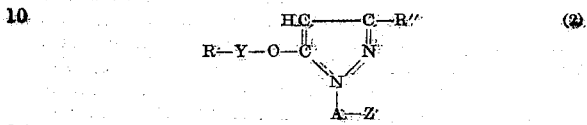

wherein R, Y, RY, and Z' have the above significance; R'' is a monovalent hydrocarbon nucleus; and A is a divalent hydrocarbon nucleus and may be aromatic, aliphatic, or aliphatic aromatic, e. g., —phenyl—CH$_2$—.

In the above formulae RY may be the acyl radical corresponding to any monocarboxylic or monosulfonic acid free from acid halide-reactive groups including fatty acids, aromatic acids, heterocyclic acids. Suitable radicals include acetyl, chloracetyl, propionyl, butyryl, carboalkoxy, e. g., carbethoxy, carbomethoxy, fluoracetyl, hexanoyl, stearoyl, benzoyl, p-nitrobenzoyl, chlorobenzoyl, 1-naphthoyl, 2-naphthoyl, picolinoyl, nicotinoyl, isonicotinoyl, furoyl, thienoyl, cyclohexanoyl, benzenesulfonyl, p-toluenesulfonyl, p-ethylbenzoyl, butanesulfonyl, chlorobutanesulfonyl, and cyclohexanesulfonyl.

The radical R'' may be alkyl, e. g., methyl, ethyl, dodecyl, hexadecyl, aryl, e. g., phenyl and naphthyl, aralkyl, e. g., benzyl or substituted radicals of this type, e. g., chlorphenyl, nitrophenyl, beta-ethoxyethyl, beta-phenoxyethyl, trichlormethyl, and carbethoxymethyl.

A still more preferred class of compounds have the general formula:

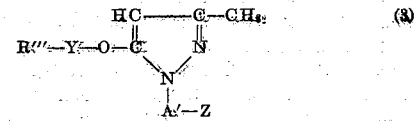

where A' is a divalent hydrocarbon nucleus which is attached to the nitrogen atom through an aromatic hydrocarbon radical, Y and Z have the same significance as in Formulae 1 and 2, and R''' is a member of the group consisting of alkyl radicals of 1 to 3 carbon atoms, alkoxyl radicals of 1 to 3 carbon atoms, and phenyl, methylphenyl, and ethylphenyl radicals. These compounds are preferred because the reactants are available commercially and, what is of more importance, the color developed azomethine dyes thereof have superior color characteristics. The compounds where R''' is alkoxy are preferred because of their resistance to hydrolysis and the ease of obtaining the compounds in a crystalline form.

A convenient and practical method for the preparation of the acid halides of 5-acyloxy-pyrazoles described above consists in reacting a 5-pyrazolone containing a carboxylic or sulfonic acid group in the 1- and/or 3-position with an organic carboxylic acid chloride or bromide or sulfonic acid chloride or bromide free from acid halide-reactive groups in an aqueous alkaline solution, isolating the resulting 5-acyloxypyrazole either as the pure acid or as an alkali metal salt and converting the acid group to an acid halide group. It is generally desirable to use at least one mol of alkali, e. g., alkali metal hydroxide per acid group and at least one mol of organic acid halide, and preferably a slight excess, e. g., 1.2 mols per mol of 5-pyrazolone. From 1.0 to 2.5 mols of alkaline compound per acid group represents a practical range. The acylation reaction is preferably carried out at temperatures from −5° C. to 30° C. and for a length of time sufficient to permit complete utilization of the acid halide. When the acid group is a sulfonic acid, the reaction product is best isolated as the potassium or sodium salt of the sulfonic acid. This is accomplished by "salting out," i. e., the addition of potassium chloride or sodium chloride. When the acid group is a carboxylic acid, the reaction product may be isolated by the addition of a mineral acid, for example, hydrochloric acid, sulfuric acid, or by the addition of an organic acid, for example, formic acid, acetic acid. In either case the reaction product is purified by crystallization.

The invention is not limited to the use of acyl halides as reactants. Similar reaction products, for instance, can be obtained by heating one molecular equivalent of a 1-aryl-5-pyrazolone containing a sulfonic or carboxylic acid group with 1.0 to 1.5 molecular equivalents of an acid anhydride, for example, acetic anhydride, at a temperature of 70°–150° C. This reaction may be carried out in an inert diluent, e. g., benzene, toluene, tetrachloroethane, etc. or in an aqueous alkaline solution, e. g., dilute sodium hydroxide.

The carboxylic acid group in the 1- and/or 3-position can be converted to the acid chloride by treatment with a slight excess of phosphorus pentachloride, phosphorus trichloride, phosphorus oxychloride, or thionyl chloride, preferably the latter, in the absence or presence of a diluent, such as benzene, chlorform, etc., at room temperature or at the reflux temperature of the diluent. To convert a sulfonic acid group to the acid chloride, phosphorus pentachloride or phosphorus oxychloride, preferably a mixture of the two, can be used, and the reaction is carried out at low temperatures, preferably 0° to 30° C. to prevent splitting of the 5-acyloxypyrazole. The 5-acyloxypyrazole carboxylic acid chlorides can be separated by filtration from the diluent. In the case of thionyl chloride, it can be isolated by removal of the excess thionyl chloride and diluent at atmospheric or slightly reduced pressure and can be purified by crystallization from an inert solvent, such as ether, benzene, petroleum ether, chloroform, etc. The 5-acyloxy-pyrazole sulfonic acid chlorides can be isolated by the careful addition of the reaction mixture to ice, the acid chlorides separated and recrystallized, if desired, from an inert solvent. However, the isolated acid chlorides are generally sufficiently pure for use as intermediates in the formation of chemical compounds and need not be purified by crystallization for such purposes.

The following examples are presented to illustrate in greater detail the processes of this invention. The quantities of reagents given in the examples are parts by weight.

EXAMPLE I

*1-(4'-carboxyphenyl)-3-methyl-5-pyrazolyl ethyl carbonate*

To 25 parts of potassium hydroxide dissolved in 400 parts of water is added 43.6 parts of 1-(4'-carboxyphenyl)-3-methyl-5-pyrazolone, and the resulting solution is cooled to 0° C. by means of an external cooling bath. While the reaction mixture is being stirred vigorously, 27 parts of ethyl chlorocarbonate is added during the course of about five minutes, the internal temperature being maintained at 2°–4° C. The solution is stirred for an additional period of 45 minutes at this temperature, extracted with ether to remove excess ethyl chlorocarbonate, treated with decolorizing charcoal and the nearly colorless filtrate is acidified by the dropwise addition of 50 per cent. acetic acid. The nearly colorless crystals of 1-(4'-carboxyphenyl)-3-methyl-5-pyrazolyl ethyl carbonate are collected, washed thoroughly with cold water, and dried to constant weight under reduced pressure over phosphorus pentoxide. The yield of material melting at 149°–151° C. is 49 parts. Crystallization from benzene gives colorless, microscopic crystals which melt at 149–151° C. Analysis, calculated for $C_{14}H_{14}O_5N_2$: C=57.91, H=4.86, N=9.65; Found: C=57.54, H=5.05, and N=10.02.

*1-(4'-chloroformylphenyl)-3-methyl-5-pyrazolyl ethyl carbonate*

To a solution of nine parts of 1-(4'-carboxyphenyl)-3-methyl-5-pyrazolyl ethyl carbonate heated to reflux in 40 parts of benzene is added during about ten minutes seven parts of thionyl chloride. The evolution of sulfur dioxide and hydrogen chloride ceases after about fifteen minutes and to complete the reaction the solution is refluxed for an additional period of one hour. The benzene and excess thionyl chloride are removed under reduced pressure and a nearly colorless solid which melts at about 70°–72° C. is recovered. Crystallization of the crude 1-(4'-chloroformylphenyl)-3-methyl-5-pyrazolyl ethyl carbonate from an ether-petroleum ether mixture gives colorless needles which melt at 70°–72° C. Analysis, calculated for $C_{14}H_{13}O_4N_2Cl$: Cl=11.49; Found: Cl=11.13.

A piece of photographic film having a silver iodobromide emulsion layer was exposed and developed in a mixture of one part of the above compound in 50 parts of alcohol and 50 parts of a color developer of the following composition:

| | Parts |
|---|---|
| p-Aminodiethylaniline hydrochloride | 2 |
| Sodium carbonate, monohydrate | 20 |
| Sodium sulfite, anhydrous | 2 |
| Water to make | 1000 |

A strong magenta color remained after removal of the metallic silver by means of a bleach containing potassium ferricyanide and removal of the silver ferrocyanide with sodium thiosulfate.

Example II

*Potassium salt of 1-4'-sulfophenyl)-3-methyl-5-pyrazolyl benzoate*

To a stirred solution of 254 parts of 1-(4'-sulfophenyl)-3-methyl-5-pyrazolone, 60 parts of potassium hydroxide, 138 parts of anhydrous potassium carbonate in 1800 parts of water cooled to 5° C., is added 155 parts of benzoyl chloride during a period of one hour. The temperature is maintained below 10° C. during the addition of the benzoyl chloride by addition of ice. Stirring is continued for 14 hours during which time the temperature is allowed to rise to 25° C. To the thick, creamy mass is added 50 parts of potassium chloride. Stirring is continued for 30 minutes and the mass is filtered. The collected crystals are washed with 3 per cent potassium chloride solution and are purified by crystallization from 400 parts of water at 60° C. The recrystallized material is dried at 48° C. under reduced pressure over phosphorus pentoxide. Analysis, calculated for $C_{17}H_{13}O_5N_2SK.H_2O$: C=49.2, H=3.6, S=7.7; Found: C=48.9, H=4.1, and S=7.3.

A piece of photographic film as described in Example I when developed as described in Example I with this compound as the color former was dyed a bluish magenta color very similar to the color obtained in Example I.

*1-(4'-chlorosulfophenyl)-3-methyl-5-pyrazolyl benzoate*

To a stirred mixture of 250 parts of phosphorus pentachloride and 420 parts of phosphorus oxychloride, cooled externally to 0° C., is added 396 parts of the potassium salt of 1-(4'-sulfophenyl)-3-methyl-5-pyrazolyl benzoate at such a rate that the temperature does not rise above 10° C. The cooling bath is removed after two hours and stirring is continued as the temperature rises to 20°-25° C. during three hours. The fluid white mixture thus obtained is then decomposed by carefully pouring into 3000 parts of cracked ice with vigorous stirring. After stirring for about one hour, the oil solidifies to a white crystalline material which is washed with water and air dried. For purification the reaction product is dissolved in 1000 parts of methylene chloride. The solution is dried over anhydrous magnesium sulfate and concentrated to about one-third the original volume. On cooling to 0° C. there is obtained 260 parts of product melting at 149°-150° C. Analysis, calculated for $$C_{17}H_{13}O_4N_2SCl:$$

C=54.2, H=3.45, S=8.48, Cl=9.16; Found: C=54.7, H=3.61, S=8.37, and Cl=9.14.

Example III

The potassium salt of 1-(2'-chloro-5'-sulfophenyl)-3-methyl-5-pyrazolyl benzoate and the acid chloride 1-(2'-chloro-5'-chlorosulfophenyl)-3-methyl-5-pyrazolyl benzoate are prepared essentially as described in Example II. The acid chloride melts at 137°-139° C. Analysis, calculated for $C_{17}H_{12}O_4N_2SCl_2$: S=7.79, N=6.82, Cl=17.26; Found: S=7.84, N=6.79, and Cl=16.63.

A piece of photographic film developed as described in Example I with this compound as the color former was dyed a magenta color similar in color to that obtained in Examples I and II.

Example IV

Following the procedure essentially as outlined in Example II, 1-(4'-carboxymethoxyphenyl)-3-methyl-5-pyrazolyl benzoate was prepared from 1-(4'-carboxymethoxyphenyl)-3-methyl-5-pyrazolone. Treatment of the purified benzoate (melting point 192°-193° C.; analysis, calculated for $C_{19}H_{18}O_5N_2$: N=7.95; Found, N=7.91) with thionyl chloride in benzene solution essentially as described in Example I yielded 1-(4'-chloroformyl-methoxyphenyl)-3-methyl-5-pyrazolyl benzoate which solidified after removal of the benzene and excess thionyl chloride.

A piece of photographic film having a silver iodobromide emulsion layer was exposed and developed as described in Example I. With this compound as the color former it was dyed a bluish magenta color.

Example V

A suspension of five parts of 1-(4'-carboxyphenyl)-3-methyl-5-pyrazolone in ten parts of acetic anhydride is heated gently until a homogeneous solution is obtained. The acetic acid and excess acetic anhydride are removed by distillation under reduced pressure on a steam bath. The resulting 1-(4'-carboxyphenyl)-3-methyl-5-pyrazolyl acetate is dissolved in ether and three parts of thionyl chloride are added. A vigorous reaction occurs and hydrogen chloride and sulfur dioxide are evolved. The mixture is refluxed gently for an additional period of fifteen minutes during which time the evolution of gases ceases. The ether is removed by evaporation and the 1-(4'-chloroformylphenyl)-3-methyl-5-pyrazolyl acetate is added to a suspension of three parts of meta-amino-benzaldehyde dimethyl acetal in a solution of three parts of potassium carbonate in 30 parts of water cooled to 5° C. The mixture is shaken gently and after several minutes the reaction product is separated, washed first with water, and then with ether. The reaction product is dissolved in alcohol and an aqueous solution of p-aminodiethylaniline is added. A film bearing a silver ferrocyanide image is color developed in this solution of color former and developer. Removal of the metallic silver gives a strong magenta image.

Example VI

*1-phenyl-3-(4'-carboxyphenyl)-5-pyrazolyl ethyl carbonate*

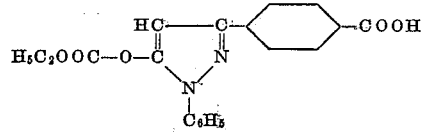

To 7.3 parts of potassium hydroxide dissolved in 150 parts of water is added 15 parts of 1-phenyl-3-(4'-carboxyphenyl)-5-pyrazolone and the resulting solution is cooled to 0° C. by means of an external cooling bath. While the reaction mixture is being stirred vigorously 6.5 parts of ethyl chlorocarbonate is added in one portion, the temperature being maintained at 0° C. by the addition of ice. The solution is stirred for a period of 15 to 20 minutes and then acidified by the dropwise addition of 40 parts of ten per cent acetic acid solution. The 1-phenyl-3-(4'-carboxyphenyl)-5-pyrazolyl ethyl carbonate is collected, air dried, and purified by crystallization from benzene. The yield of crystallized product melting at 196°-198° C. is 12 parts.

*1-phenyl-3-(4'-chloroformylphenyl)-5-pyrazolyl ethyl carbonate*

To a suspension of 12 parts of 1-phenyl-3-(4'-carboxyphenyl)-5-pyrazolyl ethyl carbonate heated to reflux in 100 parts of anhydrous benzene is added six parts thionyl chloride. The mixture is refluxed for a period of about 30 minutes during which time the solid material goes into solution and the evolution of hydrogen chloride and sulfur dioxide ceases. The benzene and excess thionyl chloride are removed under reduced pressure and a light-colored solid melting above 90° C. is obtained.

A piece of photographic film developed as described in Example I with this compound as the color former was dyed a purplish magenta.

*m-[p-(5-ethylcarbonato-1-phenyl-3-pyrazolyl) benzamido]benzaldehyde*

To a suspension of six parts of m-aminobenzaldehyde ethylene glycol acetal in a mixture of six parts of anhydrous potassium carbonate, 25 parts of water, and 25 parts anhydrous dioxane cooled to 0° C. is added dropwise a solution of 1 - phenyl-3-(4'-chloroformylphenyl)-5-pyrazolly ethyl carbonate in 25 parts of anhydrous dioxane. The temperature is maintained at 0° C. by means of external cooling. The resulting suspension is stirred for an additional period of one hour and then is diluted with 350-400 parts of water. The thick, heavy oil which separates is dissolved in 100 parts of acetone, the solution heated to 40° C., and 35 parts of a 3N hydrochloric acid solution is added gradually. A solid separates which, after dilution with cold water, is collected and washed free of acid with cold water. Crystallization of the product from benzene gives 16 parts of material melting at 184°–185.5° C. Analysis, calculated for $C_{26}H_{21}O_5N_3$ N=9.23; Found: N=9.17; 9.42.

Development of a piece of photographic film with this compound as the color former as described in Example I gives a purplish magenta dyed film.

EXAMPLE VII

*1-(4'-carboxyphenyl)-3-phenyl-5-pyrazolyl ethyl carbonate*

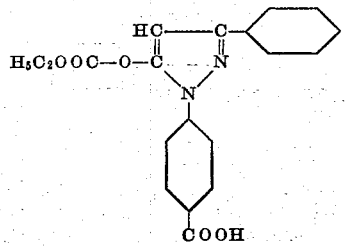

To a solution of 49 parts of 85% potassium hydroxide in 250 parts of water is added 94 parts of 1-(4'-carboxyphenyl)-3-phenyl-5-pyrazolone. The solution is cooled to 30° C. by means of external cooling and is then cooled to 0° C. by the addition of ice. Forty-nine (49) parts of ethyl chlorocarbonate is added in one portion to the vigorously stirred solution and stirring is continued for 15 minutes during which time the ethyl chlorocarbonate disappears. To the solution is added 100 parts of methanol, the mixture is heated to 20° C., and is acidified by the addition of a mixture of 60 parts of 50% acetic acid. The precipitated material is collected, washed with 20% methanol and finally with water. Crystallization from ethanol gives 74 parts of stout needles melting at 175°–177° C.

The compound 1-(4'-carboxyphenyl)-3-phenyl-5-pyrazolone which is referred to above can be made by the following procedure: To a suspension of 188 parts of p-carboxyphenylhydrazine hydrochloride in 1000 parts of water was added sufficient sodium hydroxide (approximately 80 parts) to bring the pH of the solution to 7.0–7.5. The solution was treated with decolorizing charcoal and to the light-yellow filtrate was added 1400 parts of 95% ethanol and 1150 parts of water. The solution was heated to 65° C. and a mixture of 192 parts of ethyl benzoyl-acetate and 90 parts of acetic acid was added with stirring during the course of about five minutes. The thick reaction mixture was digested at 65°–70° C. for one hour, filtered, and the filter cake washed first with 1000 parts of 30% ethanol and finally with hot water until the filtrate was colorless. The resulting colorless filter cake was suspended in 1800 parts of water and sufficient sodium hydroxide (approximately 80 parts) was added to make the solution alkaline to phenolphthalein. The resulting solution was boiled gently for 30 minutes, the pH of the solution was adjusted to about 7 by the addition of 50% acetic acid and the solution was decolorized. A mixture of 1000 parts of ethanol and 875 parts of water was added, the solution was heated to 90°–95° C. and acidified by the slow addition of 240 parts of 50% acetic acid. The colorless pyrazolone was collected, washed first with 30% alcohol, then with hot water until the filtrate was colorless and finally with 1000 parts of methanol. The yield of colorless 1-(4'-carboxyphenyl)-3-phenyl-5-pyrazolone was 210 parts.

*1-(4'-chloroformylphenyl)-3-phenyl-5-pyrazolyl ethyl carbonate*

To a mechanically stirred suspension of 70.4 parts of 1-(4'-carboxyphenyl)-3-phenyl-5-pyrazolyl ethyl carbonate in 200 parts of anhydrous benzene heated to reflux is added slowly 30 parts of thionyl chloride. After refluxing for about 30 minutes, the solid material dissolves and the evolution of sulfur dioxide and hydrogen chloride ceases. The benzene and excess thionyl chloride are removed under reduced pressure at 70°–80° C. The acid chloride separates as a nearly colorless solid melting above 90° C.

A piece of photographic film developed as described in Example I with this compound as the color former was dyed a purplish magenta color.

*m-[p-(5 - ethylcarbonato-3-phenyl-1-pyrazolyl) - benzamido] benzaldehyde*

The crude acid chloride obtained above is dissolved in 100 parts of anhydrous dioxane and the solution is added dropwise to a vigorously stirred suspension of 33 parts of m-aminobenzaldehyde ethylene glycol acetal, 34 parts of anhydrous potassium carbonate, 65 parts of water, and 70 parts of anhydrous dioxane, cooled to 0° C. by means of external cooling. The resulting suspension is stirred at 0°–5° C. for two hours, about 200 parts of water being added during this period. Additional water is added and the resulting oil is dissolved in 250 parts of acetone. The solution is heated to 40° C. and treated with 3N hydrochloric acid, a total of 200 parts being used. After about 60 parts of acid has been added, crystals of the aldehyde begin to separate. The mixture is cooled to 0° C. by the addition of ice and the precipitated product is collected, washed free of acid with cold water, and is air dried. Crystallization from benzene gives 45 parts of fine colorless needles melting at 144°–146° C. Analysis calculated for $C_{26}H_{21}O_5N_3$: C=68.54; H=4.65; N=9.23; Found: C=68.66, 68.67; H=4.51, 4.54; N=9.16, 9.42.

A piece of photographic film developed as described in Example I with this compound as the color former was dyed a purplish magenta.

In place of the particular 5-pyrazolones containing acid radicals in the 1- and 3-positions, there may be substituted a large number of other compounds of this type. Thus, referring to the above Formula 1, acid compounds may be used wherein R' is ethylene, phenylene, methylphenylene, naphthylene, benzylene, phenylenedimethylene, diphenylene, oxydiphenylene, thiodiphenylene, sulfonyldiphenylene, cyclohexylene, cyclopentylene, pyridylene, thienylene, and furylene.

Suitable additional specific acid reactants include:

1-phenyl-3-carboxymethyl-5-pyrazolone
1-methyl-3-(p-carboxyphenyl)-5-pyrazolone
1-(2'-benzothiazolyl)-3-(beta-carboxyethyl)-5-pyrazolone
1-(beta-sulfoethyl)-3-phenyl-5-pyrazolone
1-(beta-carboxyethyl)-3-methyl-5-pyrazolone
1-(p-carboxyphenyl)-3-(p-nitrophenyl)-5-pyrazolone
1-(4'-sulfo-2'-chlorophenyl)-3-methyl-5-pyrazolone
1-(p-sulfophenyl)-3-stearyl-5-pyrazolone
1-(4-sulfonaphthyl)-3-(p-chlorophenyl)-5-pyrazolone
3-(p-nitrophenyl)-5-pyrazolone-1-ethane sulfonic acid
3-methyl-5-pyrazolone-1-ethane sulfonic acid
3-heptadecyl-5-pyrazolone-1-ethane sulfonic acid
3-(p-nitrophenyl)-5-pyrazolone-1-propanol-(2') sulfonic acid-(3')
3-methyl-5-pyrazolone-1-propanol-(2') sulfonic acid-(3')
3-heptadecyl-5-pyrazolone-1-propanol-(2') sulfonic acid-(3')

Among the useful additional acid chlorides obtainable by carrying out the procedures outlined above, one may obtain 1-(2'-chloroformylphenyl)-3-furyl-5-pyrazolyl benzenesulfonate, 1-(4'-chloro-sulfonaphthyl-1')-3-methyl-5-pyrazolyl ethyl carbonate, 1-(6'-chlorosulfonaphthyl-2')-3-phenyl-5-pyrazolyl acetate, and 1-(4'-chloroformylmethoxyphenyl)-3-naphthyl-5-pyrazolyl chlorobenzoate, 1-phenyl-3-chloroformyl-5-pyrazolyl ethyl carbonate, 1-(2'-benzthiazolyl-3-(p-chloroformylphenyl)-5-pyrazolyl benzoate, 1-(2'-methoxy-5'-nitro-phenyl)-3-(p-chloroformylphenyl)-5-pyrazolyl methyl carbonate, and 1-(3'-pyridyl)-3-chloroformylmethyl-5-pyrazolyl ethyl carbonate.

The acid chlorides can be readily converted to acid fluorides by reaction with silver fluoride, arsenic trifluoride, antimony trifluoride, or zinc difluoride. The corresponding acid bromides can be prepared by substituting for the thionyl chloride, phosphorus oxychloride, and phosphorus pentachloride the corresponding bromides. Corresponding acid iodides can be made by reaction of the acid chloride with hydrogen iodide, calcium iodide, or magnesium iodide. The acid chlorides are preferred, however, because of the cost and availability of the reactants and their reactivity.

The 5-acyloxypyrazole 1- and 3-acid chlorides of this invention constitute useful dye intermediates. They couple with the development products produced by the development of the exposed silver halide images with the usual aromatic amino color developers, e. g., p-aminodiethylaniline, and produce azomethine dyes. They may be used in colloid silver halide layers or in alkaline photographic developer solutions containing primary aromatic amino developing agents. The lower molecular weight products tend to migrate upon extended processing such as in reversal procedures. However, the higher molecular weight products are quite satisfactory. They also couple with diazonium compounds and produce azo dyes.

Since the novel pyrazoles of this invention do not contain a reactive methylene group in the 4-position of the pyrazole nucleus, it is quite surprising that the compounds are color formers. They may be incorporated in developer solutions in various known manners, for example, by dissolving in a water-miscible organic solvent, e. g., acetone, and adding the solution to the aqueous developer solution. They may, if their solubility is sufficient, be added directly to the bath. In some cases the use of dispersing agents, such as alkylated naphthalene sulfonates, higher aliphatic alcohol sulfates, higher alkyl sulfonates, mineral oil sulfonates, Turkey red oil, etc., may be employed.

The color formers may be incorporated into emulsions in the conventional manner by dissolving them in a solvent which does not affect the sensitivity of the emulsion and intimately mixing the same with the colloid solution or emulsion. A small amount of an alkali metal base is sometimes advantageous in obtaining a rapid and uniform dispersion of the color former throughout the emulsion. Various emulsion components may be present without affecting dye formations. The compounds are remarkably free of deleterious effects on the photographic sensitivity and chromatic response characteristics of silver halide emulsions, e. g., silver chloride, silver bromide, and silver chlorobromide, silver bromide-iodide, etc. emulsions. They may likewise be used in conjunction with the known sensitizing dyes which render the emulsions sensitive to certain additional wave-length regions of light. They may also be used in conjunction with emulsion desensitizers, surface modifiers, and emulsions hardening agents.

They may be used with any of the conventional color coupling developing agents as described in United States Patent No. 2,319,426.

The novel acid halides are not only useful as color formers in photographic processes but are useful as intermediates for the formation of other chemicals including high molecular weight color formers or dye intermediates. The acid halide group is very highly reactive and permits attachment of the acyloxypyrazole radical to any radical bearing a primary or secondary amine group, a phenol group, an alcohol group, or an active methylene group. For example, dye intermediates containing acyloxypyrazole nuclei attached to a polymeric molecule may be prepared by reaction of the acid chlorides of the present invention with polymeric amines, phenols, and alcohols, e. g., polyvinyl alcohol, salicylic acid-formaldehyde resins, deacetylated chitin, aminobenzaldehyde acetals of polyvinyl alcohol and the like. Monomeric dye intermediates can similarly be obtained by reaction with aniline, N-methyl-p-toluidine, 2,4-dichloraniline, sulfanilic acid, ethyl acetoacetate, ethylamine, diethanolamine, octadecylamine, phenol, p-chlorophenol, beta-naphthol, methanol, ethanol, and propanol. These dye intermediates, which could not readily be obtained by any other method, are useful in the production of dyes for color photography, filters, textile dyeing, and the like.' In textile dyeing they are normally coupled with diazonium salts to give azo dyes which can be used in dyeing cotton, rayon, wool, nylon, and cellulose acetate fibers. In photographic uses it is normally desirable to attach the 5-acyloxypyrazole radical to an immobilizing radical as is well known in the art. Such immobilizing radicals are, for example, long-chain alkyl groups, cellulose residues, polynuclear ring groups, etc. A very convenient method of immobilization is by reaction with amines, phenols, or alcohols containing an alkyl group of more than five carbon atoms.

As many widely different embodiments of this invention can be made without departing from the spirit and scope thereof, it is to be understood that the invention is not to be limited except as defined by the claims.

What is claimed is:

1. Acid halide compounds of the general formula

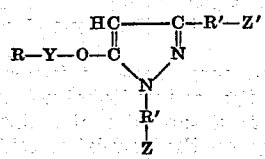

wherein Y is a member taken from the group consisting of carbonyl and sulfonyl radicals, R—Y— is an acyl radical free from acid halide-reactive groups, R' is a divalent organic radical linked by hydrocarbon carbon atoms to Z, Z', and the cyclic atoms N and C, Z and Z' are members taken from the group consisting of hydrogen, carbonyl halide and sulfonyl halide radicals, at least one of the radicals Z and Z' being such an acyl halide radical.

2. Acid halide compounds of the general formula

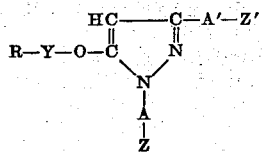

wherein Y is a member taken from the group consisting of carbonyl and sulfonyl radicals, R—Y— is an acyl radical free from acid halide reactive groups, A and A' are divalent hydrocarbon radicals, Z and Z' are members taken from the group consisting of hydrogen, carbonyl halide and sulfonyl halide radicals, at least one of the radicals Z and Z' being such an acyl halide radical.

3. Compounds of the general formula

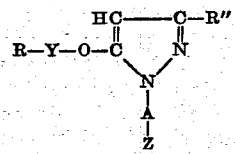

wherein Y is a member taken from the group consisting of carbonyl and sulfonyl radicals, R—Y— is an acyl radical free from acid halide-reactive groups, R'' is a monovalent hydrocarbon nucleus, A is a divalent hydrocarbon nucleus, and Z is an acid halide radical taken from the group consisting of carbonyl halide and sulfonyl halide radicals.

4. Compounds of the general formula

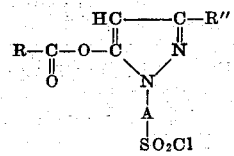

wherein

is an acyl radical free from acid halide-reactive groups, R'' is a hydrocarbon radical, and A is a divalent hydrocarbon nucleus.

5. Compounds of the general formula:

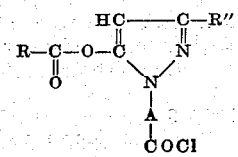

wherein

is an acyl radical free from acid halide reactive groups, and R'' is a hydrocarbon radical, and A is a divalent hydrocarbon nucleus.

6. Acid halide compounds of the general formula:

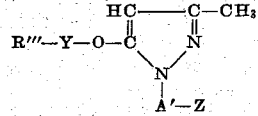

wherein A' is a divalent hydrocarbon nucleus which is attached to the 1-nitrogen atom through an aromatic hydrocarbon radical, R''' is a radical taken from the group consisting of alkyl radicals of 1 to 3 carbon atoms, alkoxy radicals of 1 to 3 carbon atoms, phenyl and alkylphenyl radicals of 7 to 8 carbon atoms, Y is a radical taken from the group consisting of carbonyl and sulfonyl radicals.

7. Compounds of the general formula:

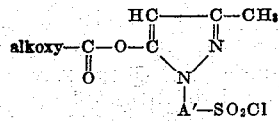

wherein alkoxy contains 1 to 3 carbon atoms and A' is a divalent hydrocarbon nucleus attached to the 1-nitrogen atom through a benzene nucleus.

8. Compounds of the general formula:

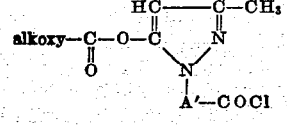

wherein alkoxy contains 1 to 3 carbon atoms and A' is a divalent hydrocarbon nucleus attached to the 1-nitrogen atom through a benzene nucleus.

9. 1 - (4'-chloroformylphenyl) - 3 - methyl - 5- pyrazolyl ethyl carbonate.

10. 1-(4'-chlorosulfophenyl)-3-methyl-5-pyrazolyl benzoate.

11. 1-(4'-chlorosulfonaphthyl-1')-3-methyl-5-pyrazolyl ethyl carbonate.

ELMORE LOUIS MARTIN.

REFERENCES CITED

The following references are of record in the file of this patent:

FOREIGN PATENTS

| Number | Country | Date |
| --- | --- | --- |
| 189,842 | Germany | Oct. 26, 1907 |

OTHER REFERENCES

Berichte der Deutschen Chemischen Gesellschaft, vol. 25, pages 1946–1947.